UNITED STATES PATENT OFFICE.

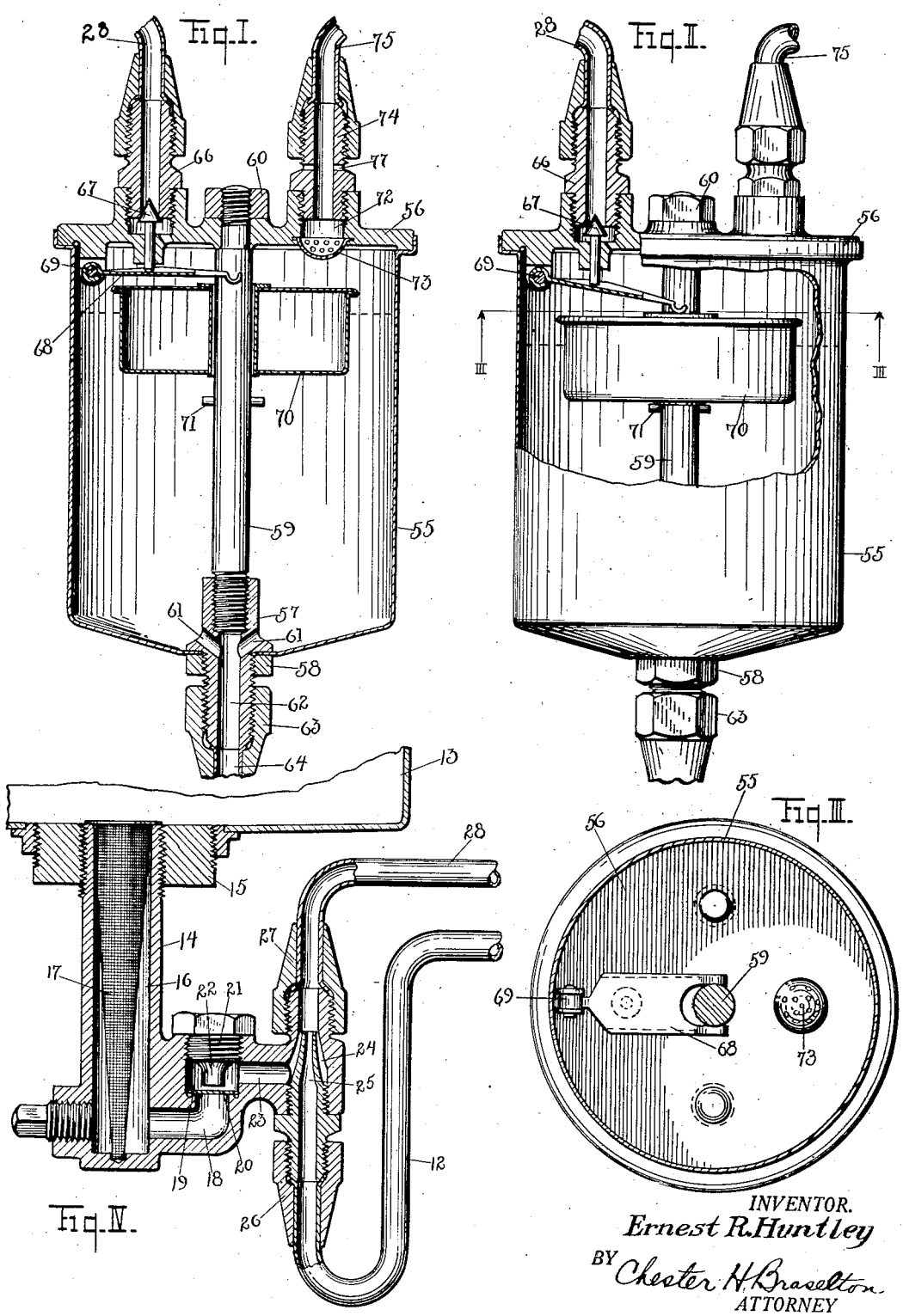

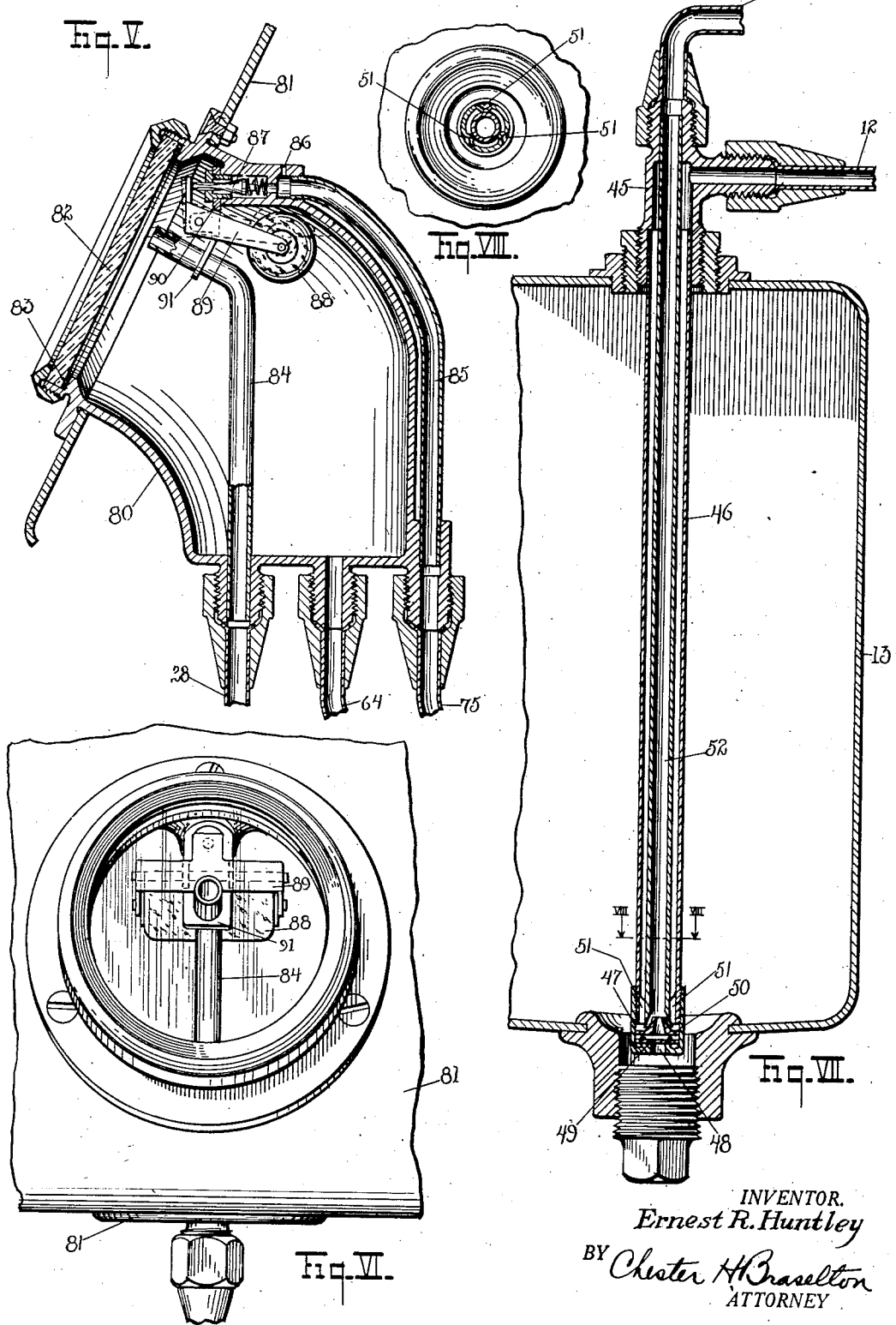

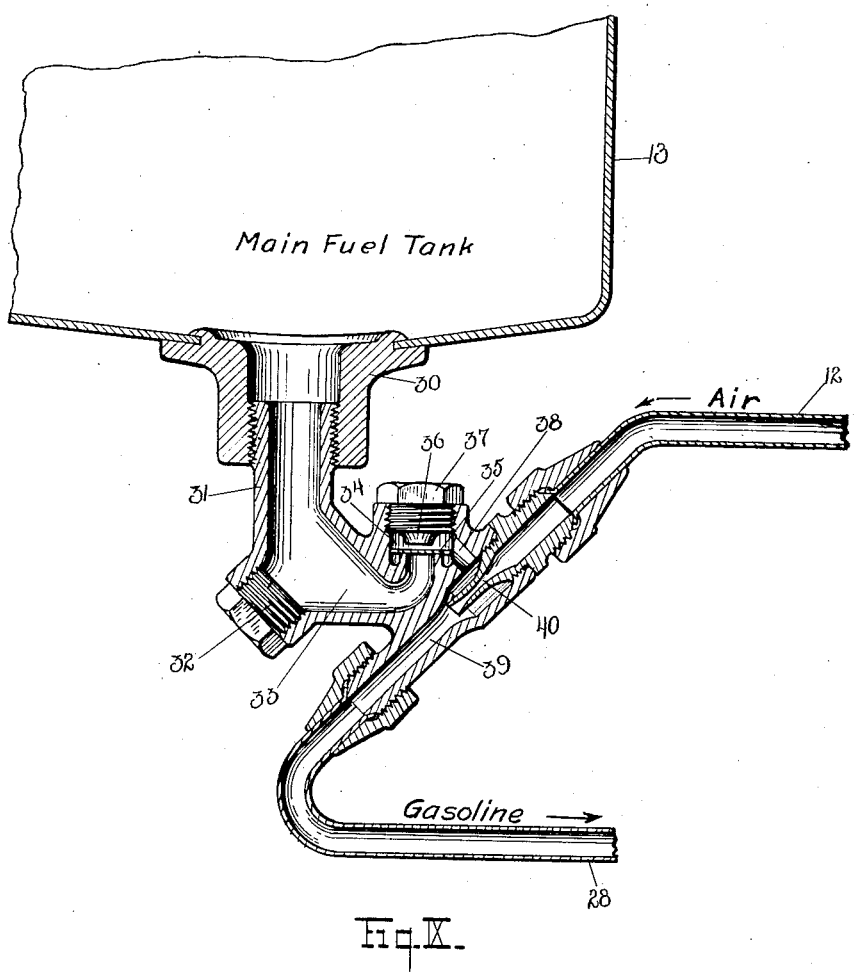

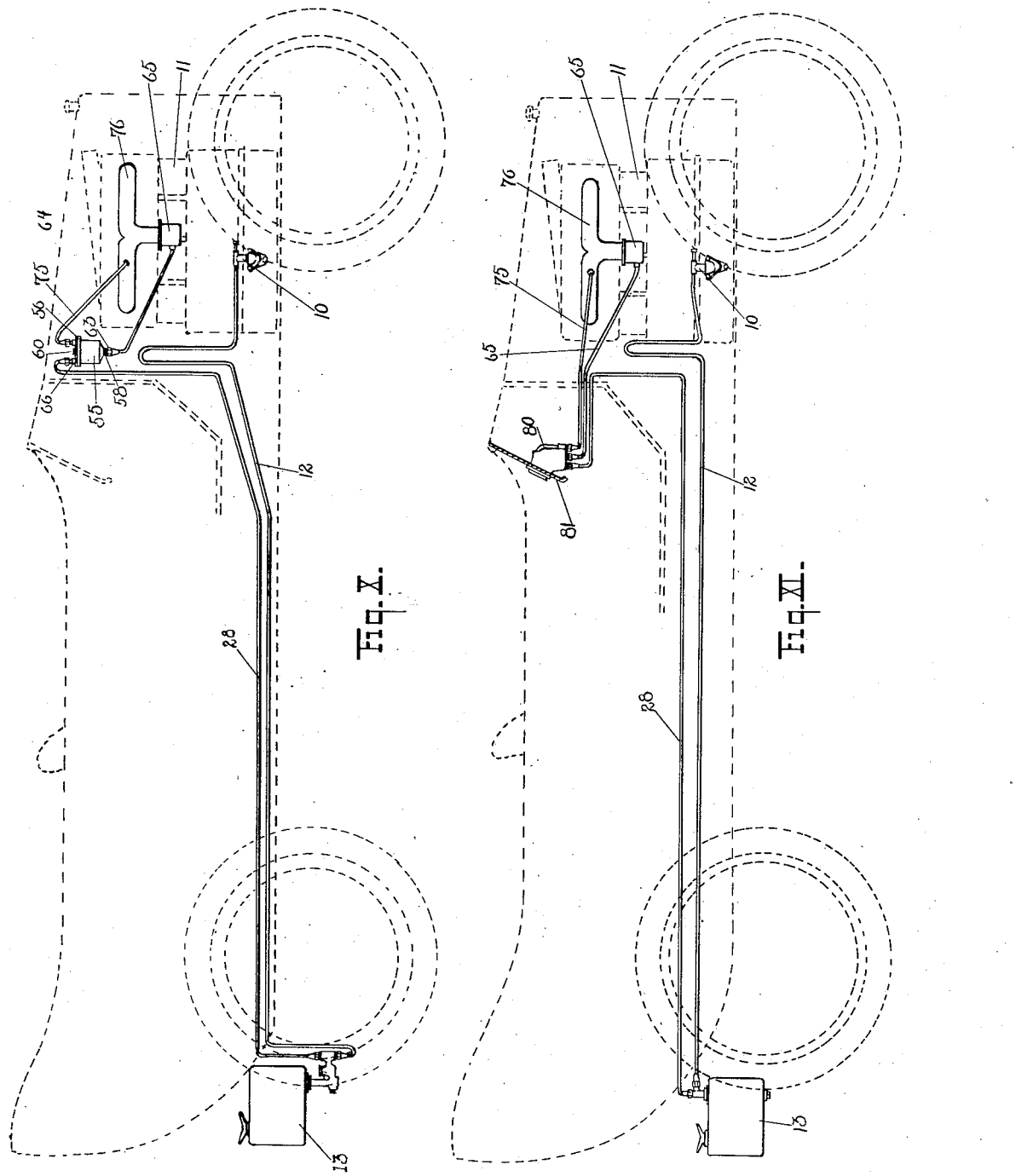

ERNEST R. HUNTLEY, OF TOLEDO, OHIO, ASSIGNOR TO INDUSTRIAL RESEARCH CORPORATION, OF TOLEDO, OHIO, A CORPORATION OF DELAWARE.

LIQUID-FUEL-FEED SYSTEM.

1,410,013.          Specification of Letters Patent.   Patented Mar. 21, 1922.

Application filed March 19, 1920. Serial No. 367,284.

*To all whom it may concern:*

Be it known that I, ERNEST R. HUNTLEY, a citizen of the United States, residing at Toledo, in the county of Lucas and State of Ohio, have invented certain new and useful Improvements in Liquid-Fuel-Feed Systems, of which I declare the following to be a full, clear, and exact description.

This invention relates to improvements in liquid feed systems, and is intended primarily for use in automobiles for the feeding of fuel from a low level tank to a high level receptacle, which may be a carbureter or an auxiliary tank from which the fuel flows by gravity to the carbureter.

The principal object of the invention is the provision of a liquid feed system which contains no moving parts requiring delicate adjustment, and which therefore is unlikely to get out of order.

Another object of the invention is the provision of an apparatus in which the motive force is compressed air.

Another object of the invention is the utilization of this compressed air for what may be termed an air lift, by means of which relatively small quantities of liquid are taken from a low level tank and blown through a pipe connection to a high level receptacle.

A further object consists in the provision in connection with an auxiliary fuel tank for an automobile to which fuel is fed by my improved air lift, of means for preventing the loss of fuel in a finely divided state carried in the air which lifts the fuel.

Other objects, and objects relating to details of construction and economies of manufacture, will appear as I proceed with the description of that embodiment of the invention, which, for the purposes of the present application, I have illustrated in the accompanying drawings, in which:

Figure I is a vertical, diametrical section of an auxiliary tank employed in connection with my invention, the shutoff valve being shown in closed position.

Fig. II is an elevational view of the same partly cut away to show the valve in the open position.

Fig. III is a horizontal cross section on line III—III, Fig. II looking in the direction of the arrows.

Fig. IV is a view principally in vertical section, illustrating one form of connection to the low level tank.

Fig. V is a vertical sectional view of a different form of auxiliary tank, shown mounted upon the instrument board of an automobile.

Fig. VI is a front view of the same.

Fig. VII is a view in vertical section showing a second form of connection for the low level tank.

Fig. VIII is a detail horizontal sectional view on line VIII—VIII, Fig. VII.

Fig. IX is a vertical section of a third form of connection to the low level tank.

Figs. X and XI are side elevational views illustrating different parts of my invention as assembled for use upon an automobile.

Similar reference characters refer to like parts throughout the views.

In the drawings, 10 indicates a small air compressor driven by any suitable means from some moving part of an internal combustion engine 11. The air thus compressed is forced through a pipe 12 to a connection mounted in the main or low level tank 13. This connection may take any one of several forms. In the drawings I have illustrated three different modifications, shown in Figs. IV, VII and IX respectively. The modifications of Figs. IV and IX illustrate fittings adapted to be threaded into the bottom of the tank in the manner illustrated in Fig. X. If desired, these fittings may be inserted in the place of the drain plug commonly furnished with such a tank. The modification of Fig. VII illustrates a connection inserted into the tank through an opening in the top thereof, the pipe connections being arranged as shown in Fig. XI.

Referring to Fig. IV, 14 is a casting threaded into a plug 15 which in turn is threaded into the drain plug opening of the tank 13. The casting 14 has a vertical cylindrical chamber 16, in which there is a fuel strainer 17. From near the bottom of the chamber 16 extends an angular passage 18, opening into a valve chamber 19. A disk-shaped check valve 20 having an indented edge rests near its periphery upon an annular seat formed in the casting. The chamber 19 is closed by a threaded plug 21, having a depending projection 22 which serves as an abutment to prevent the valve 20 from moving too far off its seat. In connection with the valve chamber 19 is a passage 23 opening into a vertical passage 24. The pipe enters the lower end of passage 24. I prefer that this connection be made through a nozzle 25 threaded into the casting and having a depending threaded portion upon which a clamping nut 26 is screwed in order to secure the pipe 12 to the fitting. A similar clamping nut 27 is used above the upper end of the passage 24 for securing in position a pipe 28 leading to the high level receptacle.

The modification illustrated in Fig. IX is very similar to that of Fig. IV excepting that in it the compressed air enters the fitting from above and the liquid leaves by a pipe 28 attached to the lower portion of the fitting. The low level tank is furnished with a threaded drain plug socket 30. The drain plug is removed and a casting 31 is secured in the socket. In the casting 31 is a small drain plug 32. The interior of the casting 31 is hollow, as shown, providing a passage 33, the upper end of which opens into a valve chamber 34 where a disk-shaped check valve 35 is located, the valve being seated near its periphery upon an annular support and being prevented from moving too far from its seat by a projection 36 on the lower end of a screw plug 37. A short inclined passage 38 connects the valve chamber 34 with a longer oppositely inclined passage 39, from the lower end of which the liquid pipe 28 extends and into the upper end of which air under pressure is introduced from the pipe 12, preferably, although not necessarily, through a nozzle 40.

Fig. VII shows a modification in which the connection to the tank is made through the top of the latter rather than through the bottom. A casting 45 is mounted in the top of the tank. A tubular element 46 depends into the tank from the casting 45, being connected to the latter by means of a fluid tight joint. The lower extremity of the tubular element 46 has threaded thereto a cup-shaped part 47, having an opening 48 through the bottom surrounded by an annular valve seat upon which rests a disk-shaped check valve 49, the upward motion of which is limited by a plug 50. The latter is provided with a central upwardly extending conical projection through which there is a tapered passage, forming what may be termed a nozzle. At its lower extremity and beneath the upper edge of the cup-shaped part 47 the tubular element 46 is pressed inwardly at three equally spaced points 51 in its periphery so as to properly center an inner tube 52, the lower end of which is counter-bored and surrounds the conical projection on the plug 50 leaving a tapering passage extending entirely around said projection. The tube 52 is supported in the upper part of the casting 45 with which it makes a tight joint and from which the fluid conducting pipe 28 extends.

When my fluid feed apparatus is employed for raising fuel in an automobile the fuel may be conducted directly from the main or low level tank to the carbureter bowl, but I prefer to employ an auxiliary tank from which the fuel may flow by gravity to the float chamber of the carbureter. The term "high level receptacle" used in this specification and in the claims following is intended to include any receptacle to which it may be desired to raise fluid from a low level tank and thus comprehends both a carbureter and an auxiliary tank in the sense in which these terms are employed in common automobile practice.

In the drawings I have shown two different forms of auxiliary tanks. That illustrated in Figs. I, II, III and X comprises a bowl 55 having a cast metal top 56. There is a central perforation in the bottom of the bowl through which extends a threaded nipple forming part of a casting 57. The edges of the bowl around the opening are clamped between the casting and a nut 58, screwed on to the nipple. A rod 59 is threaded into the upper part of casting 57, and extends through a central opening in the top 56. A nut 60 screwed on to the upper end of the rod serves to secure the top to the bowl As illustrated in Fig. I a plurality of passages 61 in the casting 57 connect the interior of the bowl with a bore 62 in the casting. A nut 63 clamps to the casting the upper extremity of a pipe 64 through which fuel may flow to the carbureter 65. A nipple 66 threaded in the top 56 provides a connection between the pipe 28 and the interior of the bowl 55, a valve 67 serving, when raised, to close the passage through the nipple. The stem of this valve extends downwardly through the top 56 and rests upon a lever 68 pivoted at 69 to a depending portion of the top 56. The free extremity of the lever is bifurcated, the spaced fingers thereof resting upon the top of a float 70 which is slidably mounted upon the rod 59, its downward motion being limited by a cross pin 71. When the float is raised to the position illustrated in Fig. I the lever 68 is rocked upwardly and the valve 67 closed, thereby stopping the admission of fuel.

A considerable amount of air enters the bowl 55 with the fuel through pipe 28. An exit for this air is provided at 72 and is covered by a strainer 73 which tends to collect the fuel with which the air is laden. However, some finely divided particles pass through the strainer 73 and thence through a nipple 74 and pipe 75 to the manifold 76 of the engine. In the nipple 74 are provided a plurality of vents 77 in order that the engine suction may not be enabled to produce a vacuum in the bowl 55 when the valve 67 is closed.

In the form of auxiliary tank shown in Fig. V the bowl 80 is somewhat elbow shaped and protrudes through an opening in the instrument board 81 of the automobile upon which the system is used. A glass disk 82 makes the movement of liquid in the tank visible to the operator. The joint between the glass and the bowl is of course air tight, a packing ring 83 being conveniently employed for this purpose. Fuel enters the bowl from pipe 28 through a small standpipe 84, the upper end of which is bent forward to a position just behind the glass 82 so as to make the flow of fluid very readily observable. The mixed air and gas from the upper part of the bowl 80 passes through a curved tube 85 before entering the pipe 75 by which is it transmitted to the engine manifold. A vent 86 in communication with the bore of the tube prevents the formation of a vacuum in the top of the bowl thus corresponding in function with the vents 77 of Fig. I. A spring pressed valve 87 tends to close the port connecting tube 85 with the interior of the bowl, but the force of its spring is adapted to be overcome by the weight of a float 88 and a bell-crank lever 89 acting upon the end of the valve stem when the liquid in the bowl is not high enough to raise the float. Bell crank lever 89 is pivoted upon a bracket 90 which may be supported from the top of the bowl in any convenient manner and is shown in the drawing as having a depending arm 91 provided with a hole through which the pipe 84 extends, thereby bracing the latter and preventing any turning movement of the bracket 90 upon its support.

The operation of my invention will be described in its application to an automobile, first with respect to the arrangement shown in Fig. X. When the engine is quiet the pipe 28 will contain a certain amount of fuel. Now, when the engine is started a compressor 10, operated thereby, causes air under pressure to be forced through pipe 12 and out of nozzle 25 (Fig. IV) impinging against the fuel in pipe 28 and tending to raise it into auxiliary tank 55. The back pressure of compressed air will hold the valve 20 closed until the pressure is relieved somewhat by the raising of the fuel. Thereupon the valve 20 opens and a quantity of fuel flows into the passage 24 to be acted upon by the compressed air. The operation continues in this way, small charges of fuel following each other in close succession in the pipe 28. The fuel enters the auxiliary tank 55 from which it passes by gravity through pipe 64 to the carbureter as needed.

The apparatus is proportioned so that the supply will exceed the demand under usual running conditions, and consequently the auxiliary tank will gradually fill, causing the float 70 to rise and close a valve 67 cutting off further admission of fuel. Pressure is thereupon built up in pipe 28 until it equals the pressure of the head of liquid in tank 13. Further additional pressure then acts to hold the valve 20 seated and prevent flow of liquid into pipe 28. If the pressure tends to increase still further it is relieved by leakage around valve 67 which is slightly depressed against the buoyancy of the float 70. The air which enters the bowl 55 necessarily carries much finely divided fuel in suspense. To permit this fuel laden air to escape to the atmosphere would be to allow a considerable waste. Consequently I have provided means for taking this air into the engine in company with the gas entering the combustion chamber. This flow of air takes place through pipe 75. The engine exerts suction through this pipe and in order that this suction may not be permitted to interfere with the flow of fuel out of the bowl 55, I provide a plurality of vents 77 in communication with the interior of pipe 75 so that pure air may be drawn into the pipe from the atmosphere when the valve 67 is closed.

The operation of the modification shown in Fig. IX is substantially the same as that of the structure shown in Fig. IV, and hence requires no additional explanation.

Referring next to the arrangement shown in Fig. XI, the operation in general is similar to that just described. Before the engine begins running, the fluid in the two concentric tubes 52 and 46 (see Fig. VII) stands at the same level as that in tank 13. Compressed air entering through pipe 12 flows down tubular element 46 around the outside of inner tube 52 and forces the fuel up tube 52 and out pipe 28 to the auxiliary tank. So long as the pressure of the air exceeds the pressure of the head of fuel in the tank tending to lift valve 49, this raising of fuel continues. As soon as the point of equilibrium is passed however, valve 40 opens and admits more fuel. A corresponding amount is then driven up the tube 52 after which the valve again opens and a second charge is admitted. This operation continues as in the case of the modification of Fig. IV.

The auxiliary tanks 55 and 80 are interchangeable so far as the other features of the invention are concerned.

There is a slight difference in the details of their operation, however. In tank 80 the fuel enters through a stand pipe 84 which discharges it against the glass 82 upon the instrument board in a convenient position for observation by the operator of the automobile. It flows out to the float chamber of the carbureter through a pipe 64. The gas laden air is permitted to flow out of the bowl 80 through tube 85 and pipe 75 to the engine manifold as in the other modification, except at times when the fluid level in the bowl 80 is high enough to raise float 88 and thereby permit the spring pressed valve 87 to close. Thereafter pressure builds up in the top of the bowl and in the pipe 28, which has the effect of stopping the flow of fuel by holding shut the check valve 20 or 49, as the case may be. Excess pressure is relieved by the leakage of air around the valve 87.

I am aware that the particular embodiment of my invention above described, and illustrated in the accompanying drawing, is susceptible of considerable variation without departing from the spirit thereof, and therefore I desire to claim my invention broadly as well as specifically, as indicated by the appended claims.

I claim as my invention:

1. In a liquid feed system, a low level tank, a high level receptacle, a fitting in communication with the interior of said tank having a liquid passage therein, to which liquid may flow by gravity from said tank, a check valve opening into said passage from said tank, an air compressor, a pipe connecting said compressor with said liquid passage, and a pipe connecting said passage with said high level receptacle.

2. In a liquid feed system, a low level tank, a high level receptacle, a fitting in communication with the interior of said tank having a liquid passage therein, to which liquid may flow by gravity from said tank, a check valve opening into said passage from said tank, an air compressor, a pipe connecting said compressor with said liquid passage, a pipe connecting said passage with said high level receptacle, and a float operated valve in said receptacle for interrupting the flow of liquid thereto after a predetermined level has been reached.

3. In a liquid feed system, a low level tank, a high level receptacle, a fitting in communication with the interior of said tank having a liquid passage therein, to which liquid may flow by gravity from said tank, a check valve opening into said passage from said tank, an air compressor, a pipe connecting said compressor with said liquid passage, a pipe connecting said passage with said high level receptacle, and a float operated valve adapted to close said last named pipe when the liquid in the receptacle has reached a predetermined level.

4. In a liquid feed system, a low level tank, a high level receptacle, a fitting in communication with the interior of said tank having a liquid passage therein, to which liquid may flow by gravity from said tank, a check valve opening into said passage from said tank, an air compressor, a pipe connecting said compressor with said liquid passage, a pipe connecting said passage with said high level receptacle, said receptacle having a vent in its upper portion, and a float controlled valve adapted to close said vent when the liquid in the receptacle has reached a predetermined level.

5. In a liquid feed system, a low level tank having a threaded drain opening, a fitting threaded into said opening having a liquid passage therein in communication with the interior of said tank, a check valve opening into said passage from said tank, an air compressor, a pipe connecting said compressor with said liquid passage, a high level receptacle, and a pipe connecting the latter with said passage.

6. In a liquid feed system, a low level tank having an opening in the top thereof, an elongated tubular element extending down through said opening to a position near the bottom of the tank, said element having a port at its lower end, an inwardly opening check valve for said port, an air compressor, a pipe connecting the latter with the upper end of said tubular element, an inner tube extending downwardly within said tubular element and spaced from the walls thereof, said inner tube terminating above said check valve, a high level receptacle, and a pipe connecting the latter with the upper end of said inner tube.

7. In a liquid feed system, a low level tank having an opening in the top thereof, an elongated tubular element extending down through said opening to a position near the bottom of the tank, a passage through the bottom of said element terminating in a nozzle, an inwardly opening check valve in said nozzle, an air compressor, a pipe connecting the latter with the upper end of said tubular element, an inner tube extending downwardly within said tubular element and spaced from the walls thereof, said inner tube terminating above said nozzle, a high level receptacle, and a pipe connecting the latter with the upper end of said inner tube.

8. In combination with an internal combustion engine having an intake pipe, a low level fuel tank, a high level receptacle, a fitting in communication with the interior of said tank having a liquid passage therein through which liquid may flow by gravity from said tank, a check valve opening into said passage from said tank, an air compressor, a pipe connecting said compressor with said liquid passage, a pipe connecting said passage with said high level receptacle, and a connection from the upper part of the latter to said intake pipe.

9. In combination with an internal combustion engine having an intake pipe, a low level fuel tank; a high level fuel receptacle; a conduit between said tank and receptacle; means for forcing liquid fuel from the tank to the receptacle; and additional means for abstracting simultaneously liquid and gaseous fuel from said receptacle.

10. In combination with an internal combustion engine, having an intake pipe, a low level fuel tank; a high level fuel receptacle; a conduit between said tank and receptacle; means including a compressor for forcing gas from the tank to the receptacle; and a plurality of conduits intermediate the receptacle and intake pipe, one of said conduits being adapted to conduct liquid fuel and another of said conduits being adapted to conduct gaseous fuel.

11. In combination with an internal combustion engine, having an intake pipe and carburetor, a low level fuel tank; a high level fuel receptacle; a conduit between said tank and receptacle; means including an air compressor for forcing gas and liquid fuel from the tank to the receptacle; a conduit for liquid between the receptacle and carburetor; and a conduit for gas between the receptacle and engine intake pipe.

In testimony whereof, I affix my signature.

ERNEST R. HUNTLEY.